Dec. 6, 1938.  H. HEUSER  2,139,408
METHOD OF MANUFACTURING YEAST FERMENTED BEVERAGES
Filed Jan. 30, 1936  2 Sheets-Sheet 1
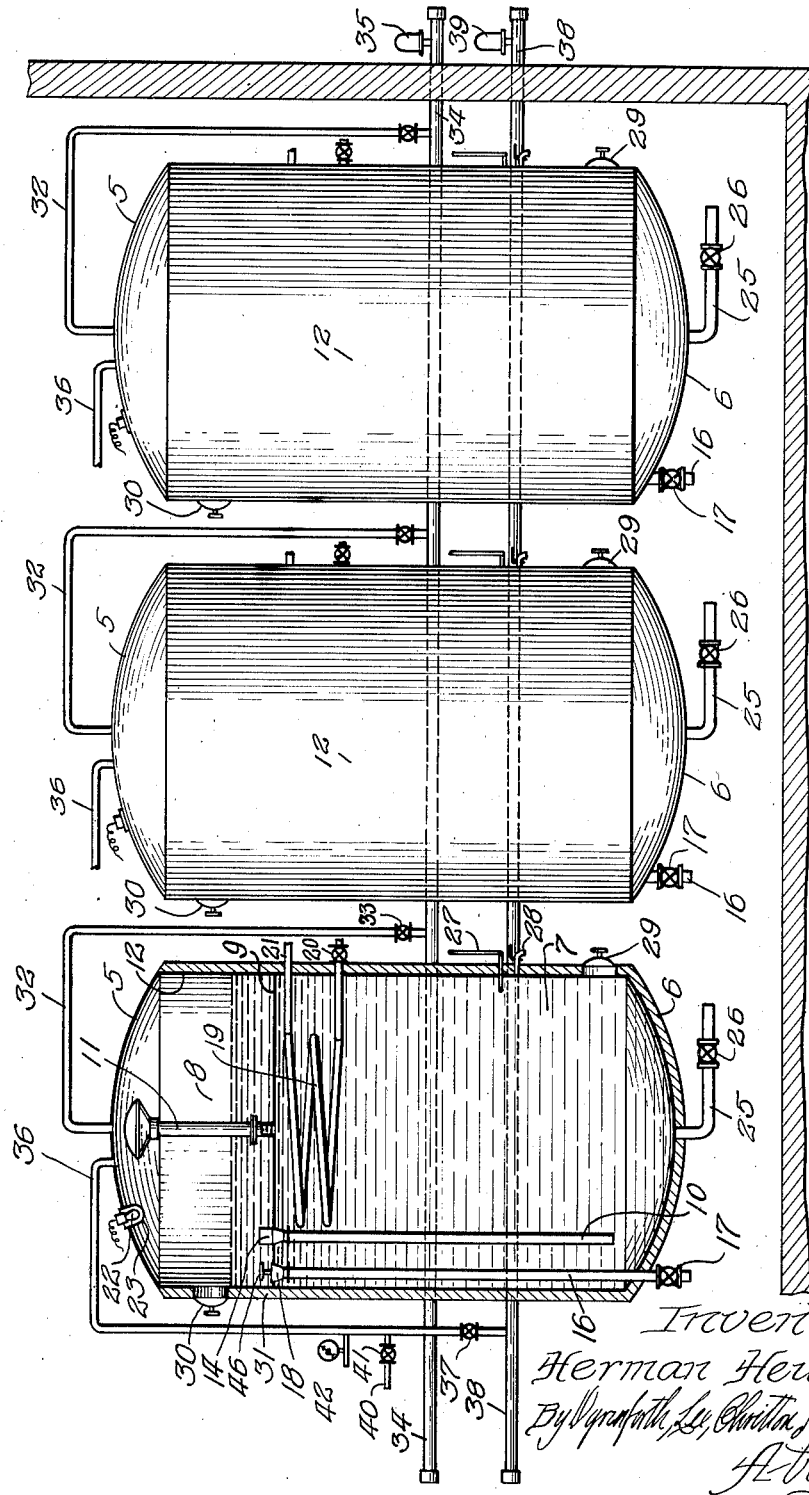

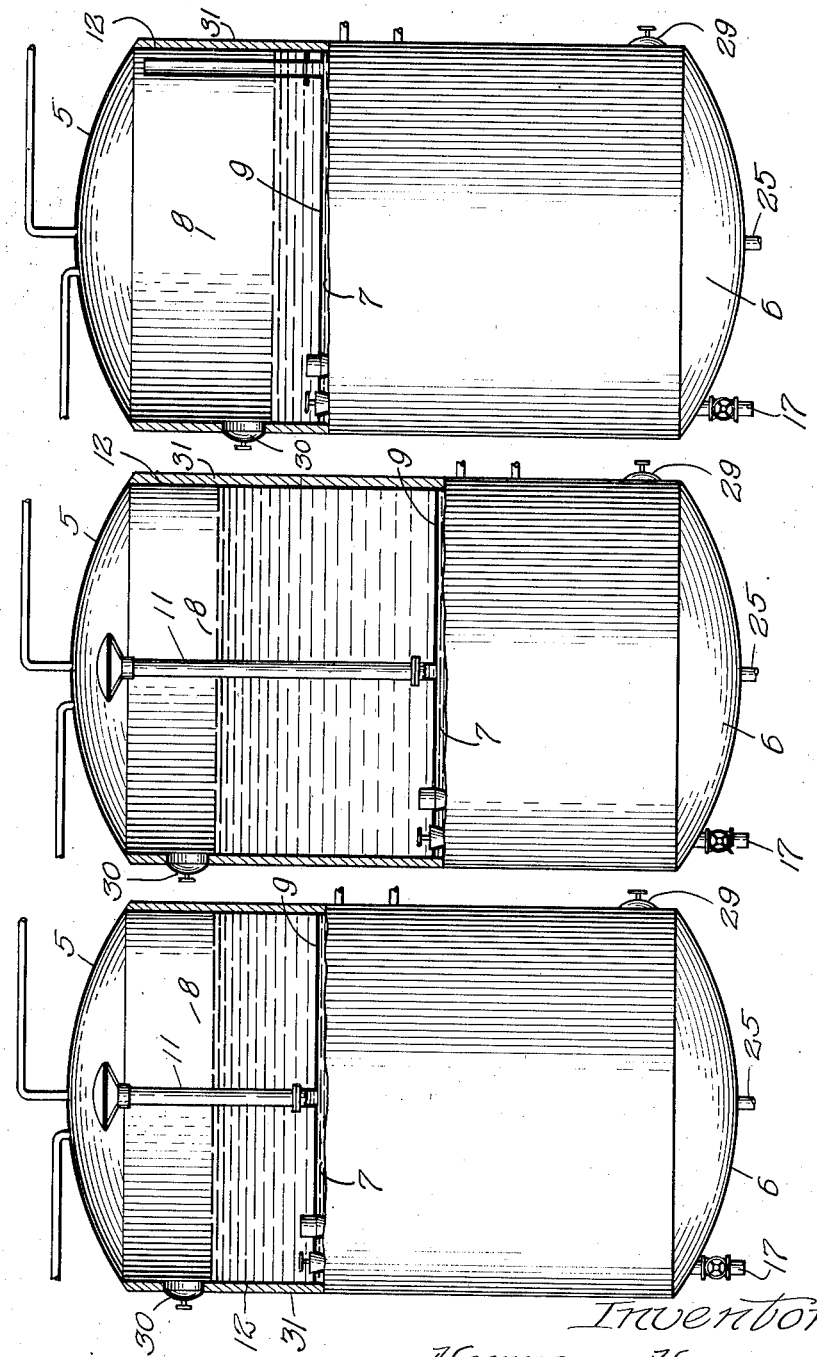

Patented Dec. 6, 1938

2,139,408

UNITED STATES PATENT OFFICE 2,139,408

METHOD OF MANUFACTURING YEAST FERMENTED BEVERAGES

Herman Heuser, Evanston, Ill.

Application January 30, 1936, Serial No. 61,627

1 Claim. (Cl. 99—41)

The present invention relates to the manufacture of yeast fermented beverages such as, for example, ale, porter, stout and beer. More particularly, my invention refers to the fermenting of these beverages. The invention consists in a novel fermenting process and in a novel fermenting apparatus.

This application is a continuation-in-part of my co-pending application, filed under Serial No. 703,012 on December 18, 1933, and Serial No. 744,844, filed September 20, 1934.

One of the objects of my invention is to invigorate the yeast during the fermentation of the beverage, whereby the characteristic taste and flavor of the beverage produced during the yeast fermentation are increased.

Another object of my invention is to produce in the manufacture of yeast fermented beverages a yeast practically free from foreign ferments and further also free from hop resins, in case of the manufacture of a yeast fermented hopped beverage, whereby it is made possible to omit the customary washing to purify the yeast, which washing greatly weakens the yeast.

A further object of my invention is to carry out the separation of the yeast from these beverages in a way that automatically produces an ample amount of yeast fit for use as pitching yeast. As is the customary practice, the yeast for example in the manufacture of ale is separated from the beverage by skimming it from the surface of the beverage. Such skimming requires very much time and attention to obtain by it a sufficient quantity of yeast that is fit for pitching. The limited amount of yeast separated from the wort in the customary manufacture of ale is the reason why usually only ½ lb. of ale yeast is used for pitching the wort. However, to use so little yeast for pitching the wort, delays the fermentation of the wort, whereby the growth of foreign ferments in the wort is invited.

The various objects of my invention are solved by my discovery that, when a yeast fermentable liquid body such as hopped wort pitched with yeast, is divided into an enclosed lower part and an enclosed upper part suitably communicating with each other, the fermenting wort flows from the enclosed lower part of the wort to the enclosed upper part of the fermenting wort and back again into the lower part of the wort. The flow of the fermenting wort greatly invigorates the yeast, whereby the characteristic taste and flavor of the beverage are greatly increased; the flow also separates the yeast from the beverage in a much larger quantity and in much purer condition than usually is the case, the separated yeast being substantially free from foreign ferments and hop resins, and being all fitted to serve as pitching yeast. The yeast possesses a white color instead of the customary dark gray color.

An apparatus suited for carrying out my invention comprises a plate laid across an enclosed fermenter preferably in a horizontal position or in a slightly inclined position and tightly fitting to the walls of the fermenter, further a passageway connecting the top part of the lower compartment of the fermenter with the upper part of the upper compartment of the fermenter, and further a passageway connecting the lower part of the upper compartment with the lower part of the lower compartment. The passageway connecting the top part of the lower compartment with the upper part of the upper compartment is preferably a pipe reaching from an opening in the plate upwards and the passageway connecting the lower part of the upper compartment with the lower part of the lower compartment is a pipe reaching from an opening in the plate downwards as illustrated in Fig. 1 of the drawings, the former pipe being termed by me the foam pipe, because the fermenting beverage flows through the same mostly in the form of foam, and the latter pipe is termed by me the return flow pipe, because the foam-free beverage flows back through this pipe into the lower compartment.

While a plurality of foam pipes may be employed, it is preferred to employ only one. This, when located in the center of the plate as shown in Fig. 1, Fig. 2 and Fig. 3 is provided with a removable hood tightly fitting by a sleeve around the top of foam pipe, the hood preventing during the fermenting operation beverage from sputtering from the top of the foam pipe into the openings of the gas pipes emanating from the top of the fermenter.

The foam pipe may be also located at or near the border of the plate with the return flow pipe directly opposite on the border of the plate near the manhole door and yeast pipe as shown in Fig. 4. This arrangement facilitates the removal of the yeast from the plate, because the plate is virtually free from any obstacle in the way of the scraping device employed by the operator working from the manhole door to scrape the yeast from the plate to the yeast pipe.

There is produced in the fermenting beverage of the lower compartment a higher pressure than in the fermenting beverage of the upper compartment because of the restricted escape through the foam pipe of the $CO_2$ produced in the lower compartment, which furnishes the motive power for the flow of the fermenting beverage.

In order to provide pressure in the lower compartment sufficient to make the fermenting beverage flow freely, the foam pipe must not be too wide, for then the $CO_2$ will escape through it without taking the beverage along. On the other hand it should not be too narrow, because then the pressure produced in the lower compartment will seriously restrict, stop, or reverse the flow through the flow pipe.

If, for example, the proportion between the diameter of the foam pipe to that of the fermenter is of the order of 1 to 30 or 1 to 36 and the proportion between the diameter of the return-flow pipe to that of the fermenter is 1 to 54, satisfactory results will be obtained with a 108 inch plate and a depth of about seven feet of wort below it.

With 100 barrels of ale wort filling up the lower compartment up to the plate a good flow of the fermenting ale wort is obtained, when the foam pipe has an area of about 9 to 12 square inches and the return flow pipe has an area of 3.25 square inches. In proportion as the holding capacity of the lower compartment increases or decreases, so the area of the foam pipe and the area of the return flow pipe increases or decreases.

For the successful carrying out of my invention it is absolutely necessary that the fermenter be charged with the yeast fermentable liquid body so high that the plate is immersed in the liquid, the immersion may be so deep that the depth of the liquid in the upper compartment is as large as the depth of the liquid in the lower compartment as indicated in Fig. 3, but generally the depth of the liquid in the upper compartment will be about 10 to 25 percent of the depth of the liquid in the lower compartment, as indicated in Fig. 1, Fig. 2 and Fig. 4.

If the fermenter were only charged up to the plate or nearly up to the plate with the yeast fermentable liquid, there would be no flow of the liquid, there would be only an ejection of yeast during the yeast-coming-up period, that is, during the latter part of the fermentation, containing entrained liquid, in the case of the employment of top yeast as in the manufacture of ale, but in case of the employment of bottom yeast as in the manufacture of beer, there would not be even an ejection of yeast through the foam pipe.

The fermentation of the yeast fermentable liquid body may be carried out under an atmospheric pressure or under a super-atmospheric pressure on the liquid in the upper comartment, it being understood, of course, that the pressure in the fermenting liquid in the lower compartment is always higher than the pressure on the liquid in the upper compartment. The employment of a super-atmospheric pressure on the liquid in the upper compartment is preferred because it increases the taste and flavor or ester content of the beverage, and more effectually preserves the beverage and the yeast against infection by foreign ferments.

The fermenter may be of any suitable form, but round fermenters are preferable, because they stand a high pressure and being without corners they are readily kept clean. As to the height of the enclosed upper compartment of the fermenter, the same should be high enough to permit a man to attend to the cleaning in the same in an upright position.

In the following I will describe an apparatus suitable to carry out my invention:

Fig. 1 is an elevation, partly in section of a battery of fermenters. Figs. 2, 3 and 4 indicate similar views of modified fermenters. Fig. 1 indicates how the $CO_2$-outlet of the fermenters in a fermenting room may be connected up to a $CO_2$-main produced by the yeast fermentation of a beverage into the atmosphere outside the plant. This arrangement for the disposal of the $CO_2$ keeps the atmosphere of the fermenting room in good condition, whereby the customary danger to the health of the men working in the fermenting room is eliminated.

The fermenting apparatus, as shown in Fig. 1, may consist of a cylindrical shell 12 preferably of steel welded to a steel top 5 and a steel bottom 6 and covered on the inside by a suitable varnish or enamel. The apparatus is divided by plate 9 into a lower compartment 7 and an upper compartment 8. Plate 9 is of metal, generally steel, preferably horizontally placed and welded tightly to the wall 12.

A passageway 11 is provided in the plate 9 through which foamy beverage flows from the lower compartment into the upper compartment. This pipe is placed on an opening in the center of plate 9. It should be so high as to reach above the beverage and foam level in the upper compartment. The pipe 10, reaching from the plate 9 deep into the lower compartment, provides a return-flow passageway through which the beverage, passed into the upper compartment as a foamy mass through the foam pipe 11, flows back into the lower compartment after separation from entrained gas. The return-flow pipe 10 is placed near the border of plate 9, it is provided with a removable short headpiece 14 that is high enough to hold back the yeast that settles on plate 9. Pipe 16 provides a passageway reaching from plate 9 downward and out of the fermenter for the discharge of the yeast therefrom. This pipe is equipped at its upper terminal with a stopper 18 and at its lower terminal with a valve 17. When the yeast is to be removed from plate 9, stopper 18 is taken out of the yeast pipe 16 and inserted into the return flow pipe 10, after the riser 14 has been taken out of the return flow pipe or the riser may be stoppered. It is preferred that the handle 46 of the stopper 18 be removable so as to provide no obstruction to removal of yeast.

Furthermore, the fermenting apparatus of Fig. 1 is equipped with a cooler 19 provided with a valve 20 for the inlet of the cooling medium, usually brine, and with an outlet 21 for its return to the cold brine supply (not shown). The fermenting apparatus is also equipped in the upper compartment 8 with an electric light 22 enclosed by a pressure proof glass casing 23 to provide the necessary light for the proper filling of the apparatus and for the removal of the yeast that has settled on the plate 9, after the fermented beverage has been removed from the fermenter. Further, the fermenting apparatus of Fig. 1 is provided with a pipe 25 controlled by valve 26 for the inlet and outlet of the beverage, further with a thermometer 27 and a trycock 28 and with a manhole door 29 in the lower compartment 7. A manhole door 30 in the upper compartment 8 permits an operator, after the fermented beverage has been removed from the fermenter, to remove the yeast that has settled on plate 9, through yeast pipe 16. The fermenter is covered on the bottom 6 and on the side walls by a suitable insulating material such as cork. The top is preferably uninsulated.

Further, the fermenting apparatus is equipped at its top 5 with a gas pipe 32 controlled by valve 33 connected to the gas main 34, which discharges the $CO_2$ through a pressure valve in the form of a blow-off valve 35 set at a relatively low pressure of say 3 to 7 pounds into the atmosphere outside the plant. The fermenting apparatus is provided with pipe 36 equipped with valve 37 which terminates in the $CO_2$ main 38 equipped with a pressure valve in the form of a blow-off valve 39 set at a relatively high pressure of say 15 to 30 pounds. Pipe 36 is connected with pipe 40 controlled by valve 41 for the introduction of compressed gas to be used during the discharge of the fermented beverage from the fermenting apparatus. Pipe 36 is also provided with a pressure gauge 42 for indicating the pressure in the fermenting apparatus during the fermentation of the beverage, the pressure in the apparatus during the discharge of the fermented beverage from the fermenter being indicated by a pressure gauge not shown, which may be attached to the trycock 28 during the discharge of the fermented beverage.

In the following I will describe a process suitable to carry out my invention in the manufacture of ale:

Hopped wort with a Balling indication of say 14 degrees and a temperature of say 60° F., aerated as usual and pitched with 1 to 1½ pounds of thick-fluid ale yeast per barrel of wort is run through valve 26 of pipe 25 into the fermenting apparatus of Fig. 1 with valve 41 open for the escape of air from the fermenter. When sufficient wort has been supplied to immerse the plate 9 to a depth say of about 15 to 20 percent of the depth of the wort in the lower compartment of the fermenter, for example, about seven feet, the flow of the wort is stopped by closing valve 26, valve 41 being also closed, and fermentation permitted to proceed.

After the fermentation of the wort has commenced, the wort flows continuously and automatically from the lower compartment 7 through foam pipe 11 into the upper compartment 8 and back again from the plate 9 through the return flow pipe 10 into the lower compartment 7. The worst flows upwards from the lower compartment through the foam pipe 11 as a foamy mass, and returns, after separation of the gas, to the lower compartment through return flow pipe 10 as liquid wort. The $CO_2$ produced during the fermentation of the wort passes through valve 33 of pipe 32 into the $CO_2$-main 34, from which it is discharged through blow-off valve 35, set at 5 pounds in the present example, into the atmosphere outside the plant.

Soon after the wort has begun its flow, a sediment of yeast settles on plate 9, which gradually becomes larger, as long as the flow of the wort continues. When the fermentation of the wort has been completed preferably to such an extent that the saccharometer indication of the samples taken at try-cock 28 do not vary anymore and that means complete fermentation of the wort, then the fermented wort or ale is cooled to a temperature of say 34 to 36° F. by cooler 19, the cooled ale being preferably kept in the fermenter, until it has sufficiently clarified. Thereupon, the clarified cooled ale is run out of the fermenter with a sufficient gas pressure being kept on it by means of compressed gas, preferably $CO_2$, passing through pipe 40 connected by a hose (not shown) to the gas supply (not shown). The gas pressure should be so high that the $CO_2$ present in the beverage remains in the beverage during its discharge from the fermenter. The beverage is prepared for the market preferably without any storage. Thereupon, the ale is forthwith carbonated and filtered and put in the trade packages. Storing of the beverage is unnecessary, because of the complete fermentation of the beverage and a sufficient clarification of the beverage in the fermenter.

In order to increase the $CO_2$ content of the beverage in the fermenter to the market content, valve 33 of pipe 32 is closed, before the fermentation of the wort has been entirely completed. This, by keeping the $CO_2$ produced in the fermenter increases the pressure on the beverage. When the pressure has reached say 25 pounds, valve 37 of pipe 36 is opened, which brings the fermenter in communication with the $CO_2$-main 38, which discharges the $CO_2$ through blow-off valve 39 at a pressure of 25 pounds.

The beverage is left under this pressure, until it has been completely fermented, as can be seen, when the Balling indication of the samples taken at trycock 28 do not vary anymore. Thereupon, the beverage is cooled to a temperature of say 34 to 36° F., and then left to clarify in the fermenter. After it has sufficiently clarified, the beverage is run from the fermenter under $CO_2$ pressure to retain its $CO_2$ content, and made ready for the market without customary storing, which would have no purpose, because the beverage, having been completely fermented and also clarified, does not require the customary after fermentation and clarification in the storage tanks. This is a great advantage because of the growth of foreign ferments in and the absorption of air by the stored beverage which occur in customary practice and which deteriorate the taste and flavor of the beverage.

After the beverage has been removed from the fermenter through valved pipe 25, the yeast is removed from plate 9. For this purpose the gas is first removed from the fermenter by valve 41, the manhole door 30 is opened, the headpiece 14 is lifted out of the return flow pipe 10, and stopper 18 is put in its place. The yeast is then scraped from the plate to the yeast pipe by means of a suitable wooden scraper and discharged through valve 17 of yeast pipe 16 into a suitable yeast receptacle.

During the fermentation the hop resins are precipitated on the walls of the upper compartment and are thus removed from the beverage. This precipitation or sticking is apparently in large measure due to or coincident with the breakdown of the foam.

The empty fermenter is now cleaned, first the upper compartment and then the lower compartment.

The ale thus produced by the use of my invention is distinguished in that it is much richer in ale taste and ale flavor than the ale made by the customary methods and it is also unusually pure in taste and flavor.

The yeast produced by the use of my invention is usually vigorous and substantially free from foreign ferments. It is also free from precipitated hop resins, which have all settled on to the vertical wall of the upper fermenting compartment. For this reason the yeast has a white color instead of the customary dark gray color.

The amount of ale yeast present after fermentation totals about 9 lbs. of thick fluid yeast per barrel of beverage, about 80 percent of this amount (all fit for pitching) being on the plate, and about 20 percent of the yeast being on the bottom of the lower compartment. This is an entirely unexpected yeast yield particularly in view of the use of superatmospheric pressure, and without the introduction of air during the fermentation, the introduction of air or oxygen having been carefully avoided. In the customary separation of yeast from ale by skimming, the amount obtained is about 35 to 40 percent of all the yeast produced and originally present in the ale wort as pitching yeast and of this only a relatively small amount is fit for pitching, after it has been washed to free it from foreign ferments and hop resins.

The invention may be also successfully employed in the manufacture of bottom fermentation beverages such as beer. In order to produce a satisfactory flow of the fermenting wort during the beer fermentation from a bottom fermentation yeast, it is necessary to carry out the fermentation at a starting temperature about 10° to 12° F. higher than usually is the case, and in addition it is generally preferred to use also a larger amount of yeast for pitching the wort than usually is the case, generally about twice as large as the usual amount of one pound per barrel of wort.

The invention may be also employed to great advantage in the manufacture of beverages made by yeast fermentation from fruit juices, such as for example grape juice and apple juice. The resulting beverage possesses, after its fermentation has been completed, an unusually rich wine taste and wine flavor. The fermenting fruit juice flows upward in the foam pipe mostly in the form of a liquid. When the fruit juice is pitched with cultivated wine yeast, then the amount of yeast that settles on the plate is about 70 percent of all the yeast that is produced during the fermentation of the fruit juice which is about 2 to 3 lbs. of thick fluid yeast per 31 gallons of fruit juice.

As is plain, the flow of the beverage is the quintessence of my invention, which flow can be only obtained by immersing the plate in the beverage; it cannot be obtained by not immersing the plate in the beverage, that is to say by filling up the fermenter with beverage only up to the plate as is the common practice. The flow of the beverage not only separates more yeast from the beverage than usually is the case, it also invigorates the yeast so that the yeast and the beverage are greatly improved and it also separates all the precipitated hop resins from the beverage and from the yeast, whereby a yeast free from hop resins is produced. It is due to the flow of the fermenting beverage that the yeast can be separated on the plate from beverages fermented by the bottom yeast such as beer in which the yeast always sinks to the bottom of the fermenter at the close of the fermentation.

The foregoing detailed description has been given for clearness of understanding only, and no unnecessary limitations should be understood therefrom, but the appended claim should be construed as broadly as permissible, in view of the prior art.

I claim:

The method of fermenting beverages for the recovery in pure form of the bulk of the yeast therein which comprises, fermenting the yeast-pitched, yeast-fermentable liquid body under a relatively low super-atmospheric pressure until the liquid is nearly fermented, and then completing the fermentation under a relatively high super-atmospheric pressure, whereby during the fermentation $CO_2$ is generated from the liquid and forms a foamy mass including liquid, gas and yeast, passing the foamy mass autogenously by displacement into a secondary fermenting body of a liquid, separating liquid and yeast from the foam and continuously returning liquid to the primary fermenting body, the rate of passage of the foamy mass into the secondary body being correlated to the fermenting time so that the bulk of the yeast is passed into the secondary body.

HERMAN HEUSER.